Aug. 2, 1960
L. J. HEPPNER
2,947,225
POLYGONAL HOLE FORMING TOOL
Filed Dec. 19, 1958
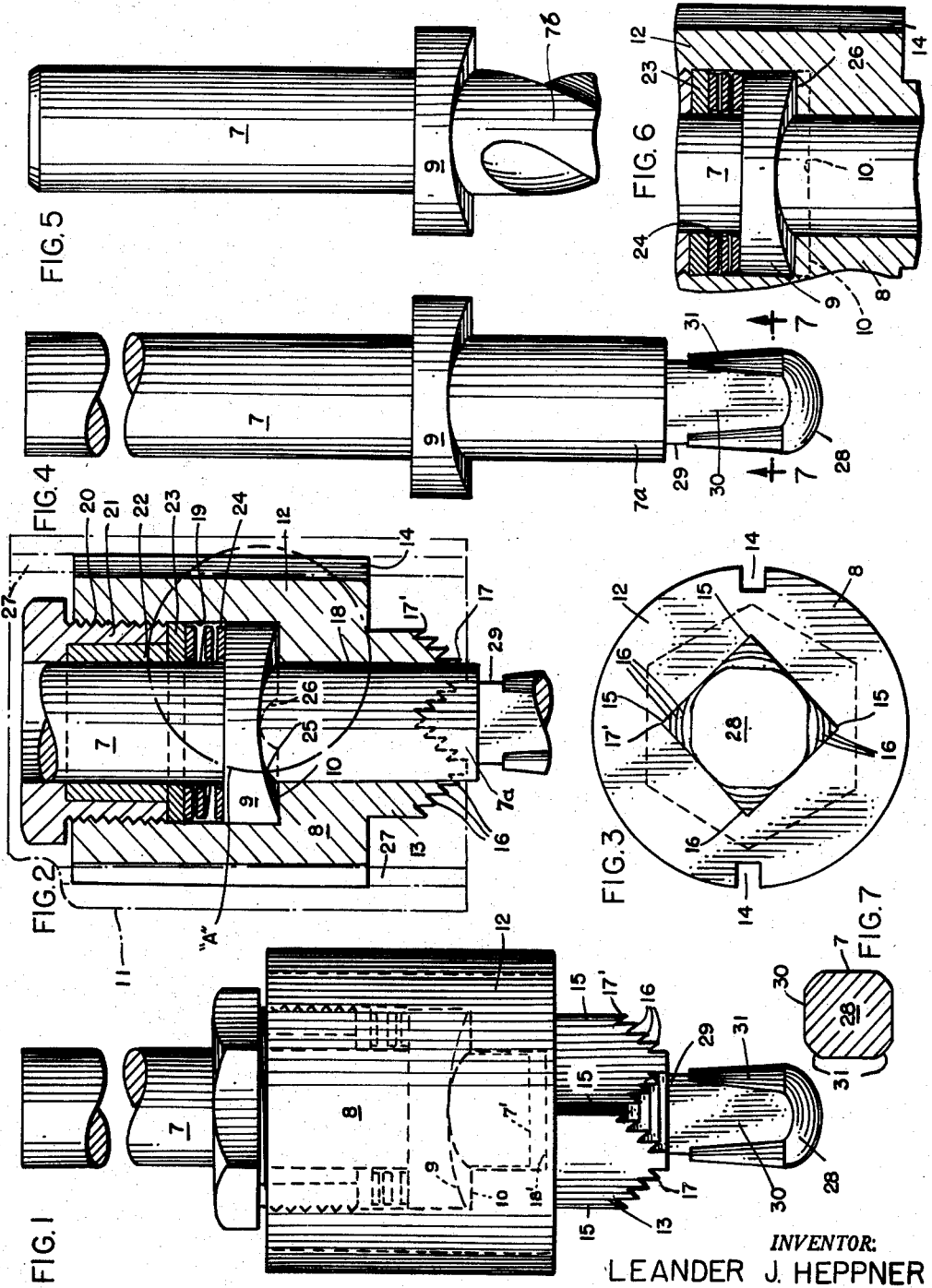
INVENTOR:
LEANDER J. HEPPNER
BY
Rummler, Rummler & Snow
ATT'YS

United States Patent Office 2,947,225
Patented Aug. 2, 1960

2,947,225
POLYGONAL HOLE FORMING TOOL
Leander J. Heppner, 4930 W. Jackson Blvd., Chicago 44, Ill.
Filed Dec. 19, 1958, Ser. No. 782,350
8 Claims. (Cl. 90—24)

This invention relates to tools for forming square or polygonal flat sided holes in a work piece.

Industry always has been confronted with the problem of forming flat sided holes in materials where such holes had such a degree of imperativeness that annular holes often could not serve as a substitute. Heretofore, many forms of tools have been devised for forming square holes with varying degrees of satisfactory results. However, such devices were usually designed for working wood, or similar relatively soft material only, and where generally of a complicated and costly form.

The main objects of this invention are to provide an improved form of implement for forming polygonal flat sided holes, such as square or hexagonal holes, in various kinds of work pieces and especially metal or other substances of comparable hardness as well as wood and relatively soft materials; to provide an improved tool of this kind adapted for use in reaming out an annular bore to square or polygonal flat-sided form, either at the time of its drilling or subsequently thereto; to provide a tool of this kind having an improved form of reaming element for cooperative association with a drill or a leader pin; to provide an implement of this kind having improved coacting means on the reamer element and the drill or leader pin for effecting the reciprocation of the reamer element to advance it through the work piece; to provide an improved cutter for forming flat-sided polygonal holes; and to provide an improved instrument of this kind which is of such simple construction as to make its manufacture highly economical and its use very efficient.

A specific embodiment of this invention is shown in the accompanying drawings in which:

Figure 1 is a side elevation of a tool constructed in accordance with this invention and having an integral pilot or leader portion on the cutter element;

Fig. 2 is a vertical, sectional elevation of a similar tool, but having a pilot portion as an extension of the central rotating element extending axially through the cutter element;

Fig. 3 is a bottom plan of the tool shown in Fig. 1 showing the arrangement of the chisel teeth on the cutter element.

Fig. 4 is a vertical elevation of a combined drive and leader pin, with a cam ring thereon, for use with a tool of this kind;

Fig. 5 is a similar view of a drill modified for use with a tool of this kind;

Fig. 6 is a fragmentary, sectional detail including the circle part "A" of Fig. 2, but showing an altered relationship of the elements as effected by the cam means on the tool; and Fig. 7 is a sectional view of the leader pin pilot portion as taken on line 7—7 of Fig. 4.

The essential concept of this invention involves a pair of concentrically-arranged, axially-shiftable elements, one of which is of cylindrical form to be rotated and the other of which is formed with a tapered-corner flat-sided reamer section, the two elements having interposed coacting cam parts which effect a relative axial reciprocation thereof, as the one element is rotated, to cause a hammer action on the latter element to ream out the peripheral portions of an annularly-drilled bore to form the requisite flat sided hole.

A square-hole forming tool embodying the foregoing concept, as shown herein, comprises a pair of elements 7 and 8 concentrically arranged, with interposed cam rings 9 and 10, and respectively connectable to a conventional chuck of a rotating head (not shown), and an internally splined retainer 11 slidably mounted on the body 8 for effecting the relative rotary and axial movement of the two elements.

The element 7, which is a driver member, is of slender cylindrical form with the cam ring 9 integrated thereto intermediate the ends of the element. Below the cam ring 9, the element 7 may either terminate in a short stub end 7' rotatively fitting a socket in the body 8 below the cam ring 10, as shown in Fig. 1, or extend through an axial bore in the body 8 to serve as a leader pin 7a as shown in Fig. 2, or it may have the conventional spiral cutting groove, as shown in Fig. 5, to serve as a drill 7b. The upper end of the element 7 is shaped to fit in the conventional chuck of a hand- or power-drill device.

The element 8 is in the form of a comparatively short cylindrical body member 12 having a pendant portion 13 of square cross-section. On its periphery, the body section 12 is provided with diametrically opposed longitudinal grooves 14, the purpose of which will be explained presently.

The pendant section 13 has its side-wall corners ground away to conform to the surface of a right circular cone converging toward the bottom or tip end of the cutter, from a base diameter equal to twice the maximum radial dimension of the section 13, whereby the corners of the section 13 are conically tapered inwardly toward its lower end and the axis of the element 7. The tapered portion is then radially and annularly undercut at uniform intervals to form a series of steps of progressively increasing angular length as they converge, at an angle of about 30° to the tool axis, to almost form a circle at the bottom end having a diameter equal to the initial bore, or, in the form shown in the drawings, to one side of the square hole to be formed. The tool shown thus has four corner cutting parts 15 of equal size and shape. Also, these tapered corner cutting parts 15 are axially undercut to form a plurality of concentric chisel-like cutting edges or teeth 16 of decreasing length from an almost continuous annular tooth 17 at the bottom end of the cutter 13, to the intersection of the conical taper with the corner edge 15. Thus at the point 17 the cutting edge is almost continuous annularly and at the upper end of the tapered portion the cutting edge is merely a point 17'.

As shown in Fig. 2 the element 8 has bores 18 and 19, of differing diameters, extending inwardly from opposite faces and at their juncture forming a ledge constituting the cam surface 10 nearly medially of the axial length of the element 8. The smaller bore 18 slidably fits the forward extension of the element 7 whereas the larger bore 19 slidably fits the cam ring 9 integral on the element 7. At its upper end this larger bore 19 is threaded at 20 to receive a conventional bushing 21 which here is shown embracing a bearing 22 for the inner element 7. Intermediate a washer 23, abutting the inner end of the bushing 21, and the cam ring 9, is a flat compression spring 24 which yieldingly holds the cam rings 9 and 10 in constant operative contact.

In the form of the tool shown in Fig. 1, wherein the pilot portion is integral on the depending cutter member 13, the lower or smaller bore 18', below the cam shoulder 10, terminates within the body 8 and merely provides a guide socket for the driver element 7. In such cases the extension 7' of the driver may be axially grooved on its periphery to obviate any pumping action during relative axial movement of the parts.

As shown, the cam rings 9 and 10, as previously noted, are integral parts of the two elements 7 and 8, respectively. The opposed effective surfaces are the under side of the integral enlargement of the element 7 and the ledge formed at the juncture of the differing-diameter bores 18 and 19 of the element 8.

As is most clear from the drawing, the cam ring 9 has at least one depression 25 and the cam ledge 10 has at least one complementary rise 26 (Fig. 2) formed on their respective opposed faces. The coacting of such a rise and depression, during the relative rotation of the elements 7 and 8, results in a reciprocation of the elements 8 and 7 relative to each other to effect the hammer action on the element 8 and thereby cause the reaming of a bore through a work piece to the desired flat-sided form.

The retainer 11 is intended for holding the outer element 8 against rotation. It is indicated in dotted outline on Fig. 2 and is shown as an annular collar having a pair of internal splines 27 which seat in the slots 14 on the outer element 8. Such a retainer 11 is preferably of a length to be grasped by the operator's hand and is normally held against the surface of the piece being worked. It will be understood, however, that the retainer may also be formed for attachment to the chuck-supporting head of a hand or power-operated device.

As shown in Figs. 1, 4 and 7 the tip or pilot end 28 which projects beyond the cutter portion 13 of the outer member 8, is undercut just below the lowermost cutting edge of the portion 13 to provide an annular chip receiving channel 29 and the sides of the tip 28 are flattened as at 30 to provide egress passages for the chips. The flattened portions 30 are narrow enough not to meet each other at their side edges thus leaving lands 31, which are axially extending portions of a cylindrical surface having the diameter of the round hole to be reamed and which serve as guide means to keep the tool centered in the bore as it is being reamed.

The operation of this improved flat-sided-hole forming tool is as follows:

As is quite evident from the drawing the tool operates the same whether working a bore contemporaneously or subsequently of its being drilled in a work piece. In the one case the inner element 7 is a conventional drill 7b having the cam ring 9 integral on its shank, as in Fig. 5. In the other case the element 7 is a plain-surface leader pin 7a which extends through an axial bore in the body 8 and cutter portion 13, as in Fig. 2; or is a stub shaft member terminating within the body 8, as in Fig. 1. In the latter case the pilot portion 28 is integral on the pendant cutter portion 13.

In making ready for operation, the tool is positioned on the head of a conventional hand- or power-driven device with the upper end of the element 7 locked in the chuck and the outer element 8 embraced by the retainer 11 and held against turning by the splines 27 of the retainer.

As the element 7 is rotated by the device—either to drill a bore through a work piece or to follow one previously drilled—the coacting cam depression 25 and rise 26 effect a constant and rapid hammering of the outer element 8 on the rotataing inner element 7 causing the cutting edges 16 of the tapered corner parts 15 of the pendant cutter section 13 to chisel away portions of the work piece which are tangential to the circumference of the annular bore through which the cutter section of the element 8 is being forced.

The main advantages of this invention reside in the utmost simplicity of the tool, its relatively small size, and the fact that it is readily usable with ordinary hand power tools such as an electric drill. Further advantages are to be found in that the improved cutter or reaming element may be used on metal as well as wood, because of the novel formation of the cutting teeth; and in the novel construction of the device which provides great strength for heavy work and at the same time is relatively cheap to manufacture.

Although two specific embodiments of this invention are herein shown and described it will be understood that details of the construction shown may be altered or omitted without departing from the spirit of the invention as defined by the following claims:

I claim:

1. A tool for forming polygonal holes in a work piece comprising, a pair of axially aligned elements one of which is axially shiftable relative to the other, one of said elements being adapted for rotation about the axis of a bore in the work piece and the other of said elements having a forwardly projecting axially aligned member of polygonal cross section and formed with axially successive cutting edge corner parts each conforming to an annular segment of a right circular conical surface and of progressively reduced radial dimension adapted to shear out radially successive peripheral portions of the work piece bore at angularly spaced locations about the circumference of the bore as said other element progresses through the bore, and cam means driven by said one element and coacting with said other element to effect relative reciprocation of said elements and drive said other element other element axially into the work piece bore.

2. A tool for forming polygonal holes in a work piece comprising, a pair of axially aligned elements one of which is axially shiftable relative to the other, one of said elements being adapted for rotation about the axis of a bore in the work piece and the other of said elements having a forwardly projecting axially aligned member of polygonal cross section formed with the corners of said member conically tapered forwardly toward the axis of said elements and peripherally recessed at axially spaced intervals to provide a concentric series of axially successive steps each of which is undercut to provide a cutting edge, whereby advance of said member into the work piece bore causes the cutting edges to progressively shear out radially successive peripheral portions of the work piece bore at angularly spaced locations about the circumference of the bore, and cam means driven by said one element and coacting with said other element to effect relative reciprocation of said elements and drive said other element axially into the work piece bore.

3. A tool for forming square holes in a work piece comprising, a pair of concentrically-arranged elements relatively shiftable axially of each other, the inner element being cylindrical in form and adapted for rotative forward advance axially through a bore in the work piece, the outer element having a rectangular section formed with the four corner portions conically tapered forwardly toward the axis of the inner element and peripherally recessed to provide a concentric series of axially successive cutting edges, and means for advancing said outer element with the axial movement of the inner element to shear out radially successive peripheral portions of the work piece at right-angularly spaced locations about the circumference of the bore, said means including coacting cam parts formed on the respective elements whereby the rotation of the inner element effects a reciprocation of one element relative to the other element.

4. A tool for forming square holes in a work piece comprising, a pair of concentrically-arranged elements relatively shiftable axially of each other, the inner element being cylindrical in form and adapted for rotative advance axially through a bore in the work piece, an annular cam ring integrated with the inner element intermediate its ends, the outer element having an axial bore extending therethrough, the lower section of said bore slidingly fitting the inner element below the said cam ring and the upper section of said bore slidingly fitting the periphery of said cam ring, a threaded member inserted in the upper section of the outer-element bore to retain the elements in axially reciprocable relationship whereby the outer element advances axially with the inner element through the work piece bore, the lower end of the outer element being of square cross-section with the four corner portions thereof conically tapered toward the inner element and recessed at axially spaced intervals to provide a concentric series of axially successive cutting edges, resilient means interposed between the threaded retaining member and the inner member ring to normally urge the elements toward one limit of their relative movement, and cam parts formed on the opposed faces of the inner element ring and the outer element whereby the rotation of the inner element effects a relative reciprocation of the elements to cause a corner shearing operation of the lower end of the outer element in the work piece bore.

5. A tool for forming square holes in a work piece comprising, a pair of concentrically-arranged elements relatively shiftable axially of each other, the inner element being cylindrical in form and adapted for rotative advance through a bore in the work piece, the outer element having a body part and a rectangular extension thereon of square cross section formed with the four corners conically tapered forwardly toward the inner element and peripherally recessed at axially spaced intervals to provide a concentric series of axially successive steps each of which is undercut to provide a cutting edge whereby the advance of the outer member with the inner element into the bore of the work piece causes the cutting edges to progressively shear out radially successive peripheral portions of the work piece at right-angularly spaced locations about the circumference of the bore, and coacting cam parts formed on the respective elements whereby the rotation of the inner element effects a hammer action on the said outer element in the axially forward direction.

6. A tool for reaming an annular bore in a work piece to form said bore to a flat sided hole comprising, a cutter body having a cross-section of the shape of the desired hole and formed with the corner portions of said body tapered forwardly toward the cutter axis, the tapered corner portions of said cutter body being peripherally recessed at axially spaced intervals to provide a cencentric series of axially successive cutting edges of progressively reduced radial dimension adapted to shear out radially successive peripheral portions of said work piece bore, at angularly spaced locations about the circumference of said bore, as the cutter is advanced axially into said bore.

7. A tool for reaming an annular bore in a work piece to form said bore to a flat sided hole comprising, a cutter body having a cross-section of the shape of the desired hole and formed with the corner portions of said body tapered forwardly toward the cutter axis, the tapered corner portions of said cutter body being peripherally recessed at axially spaced intervals and undercut to provide a concentric series of axially successive cutting edges of progressively reduced radial dimension adapted to shear out radially successive peripheral portions of said work piece bore, at angularly spaced locations about the circumference of said bore, as the cutter is advanced axially into said bore.

8. A tool for reaming an annular bore in a work piece to form said bore to a square hole comprising, a cutter of rectangular cross section formed with the corner parts thereof conically tapered forwardly toward the cutter axis and peripherally recessed at axially spaced intervals to provide a plurality of axially successive cutting edges of progressively reduced radial dimension, said cutting edges being adapted to shear out successive peripheral portions of said work piece bore at right angularly spaced locations about the circumference of the bore as the cutter is advanced axially into the bore.

References Cited in the file of this patent

UNITED STATES PATENTS

| 1,610,870 | McCarty | Dec. 14, 1926 |
| 2,015,686 | McMahon | Oct. 1, 1935 |

FOREIGN PATENTS

| 856,084 | France | Mar. 4, 1940 |